United States Patent [19]

Pavlovsky

[11] 4,222,692
[45] Sep. 16, 1980

[54] MACHINE TOOL FEED SYSTEM WITH ADJUSTABLE BEARINGS

[75] Inventor: Rudolf Pavlovsky, Schaffhausen, Switzerland

[73] Assignee: George Fischer Aktiengesellschaft, Switzerland

[21] Appl. No.: 957,857

[22] Filed: Nov. 6, 1978

[30] Foreign Application Priority Data

Nov. 15, 1977 [CH] Switzerland ............... 13904/77

[51] Int. Cl.³ ................................ F16C 21/00
[52] U.S. Cl. ........................... 409/141; 308/3 A; 409/231
[58] Field of Search ............... 409/141, 146, 209, 231; 308/3 A, 3 R

[56] References Cited

U.S. PATENT DOCUMENTS

| | | | |
|---|---|---|---|
| 3,222,991 | 12/1965 | Bone | 409/231 |
| 3,438,288 | 4/1969 | Kaiser | 409/231 X |
| 3,580,135 | 5/1971 | Jones | 409/231 |
| 3,664,228 | 5/1972 | Hasz | 409/141 |
| 3,673,918 | 7/1972 | Zandl | 409/141 |
| 3,747,470 | 7/1973 | Inoue et al. | 409/141 |
| 3,869,002 | 3/1975 | Koenig | 409/231 X |
| 4,047,469 | 9/1977 | Sakata | 409/141 X |

FOREIGN PATENT DOCUMENTS

206250 12/1967 U.S.S.R. ............... 308/3

*Primary Examiner*—William R. Briggs
*Attorney, Agent, or Firm*—Roylance, Abrams, Berdo & Farley

[57] ABSTRACT

A feed system for machine tools in which rapidly changing cutting forces occur in milling machines with an hydraulic piston drive, a position control system and a carriage supporting either the tool or the workpiece for relative movement. The carriage is movably mounted on guides with preloadable bearings shiftably or swivelably. Dry-running friction bearings on the carriage are equipped with an automatically readjusting pressure arrangement, by means of which an adjustable shifting resistance is generated, which corresponds at least to the magnitude of the cutting force occurring. Preferably, the pressure arrangement consists of a pressure piston which may be acted upon by means of an adjustable pressure. In the case of the use of post guides, the bearings are equipped with three slide surfaces mutually displaced by 120° and the pressure piston acts radially on one of the three slide surfaces. The adjustability of the shifting resistance permits chatter-free milling even when slight masses are to be shifted and the cutting forces change greatly. The slide surfaces of the dry friction bearings have sharp edges acting as wipers, permitting use in highly dusty conditions.

10 Claims, 7 Drawing Figures

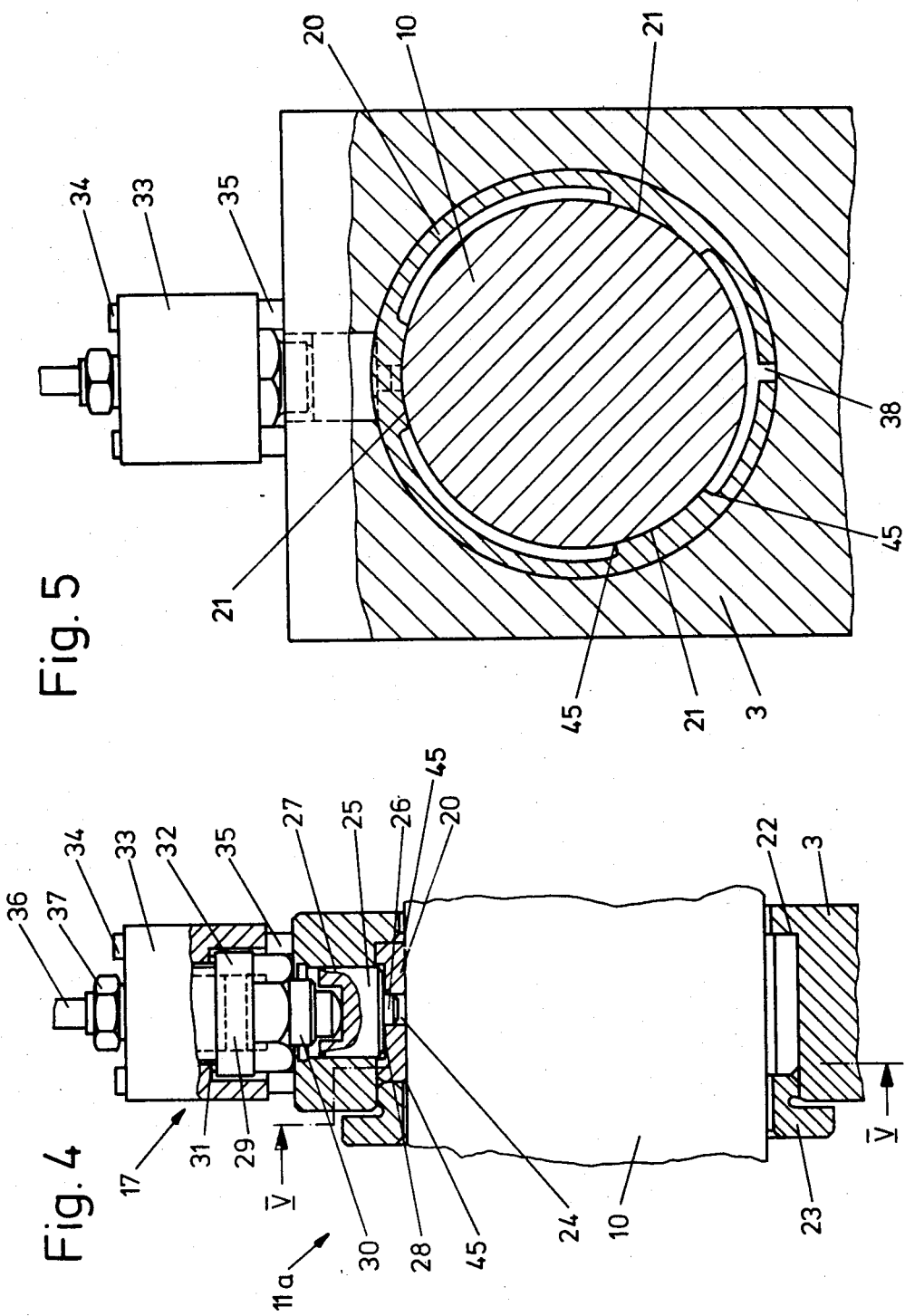

MACHINE TOOL FEED SYSTEM WITH ADJUSTABLE BEARINGS

This invention relates to a feed apparatus for machine tools of a type in which rapidly changing cutting forces occur.

BACKGROUND OF THE INVENTION

The invention is particularly related to cutting machines for operating on a workpiece, such as milling machines, which have an hydraulic piston and cylinder drive, and an apparatus for supporting the workpiece and a cutting head and for accomplishing relative movement between these components. In this connection, it will be recognized that milling and other workpiece processing machines can take any of three basic forms, one being in which the cutting tool is held in substantially one position while the workpiece is moved and rotated to present appropriate portions thereof to the tools; a second in which the workpiece is held substantially fixed while the tool is caused to move relative to the workpiece; and a third in which part of the movement is accomplished by moving the workpiece while the remaining necessary movement is accomplished by moving the cutting head. It is known to provide a milling machine with table-feed arrangements of the general category with a stable position control system. However, it is necessary in milling operations to accomplish the cutting in a chatter-free manner, and in the known table feed apparatus, it is possible to attain chatter-free milling only when the milling performance, or the cutting forces, are very small relative to the various masses of the machine itself, including the weight of the movable carriage plus the weight of the workpiece. An optimum design of the masses to be moved for greatly variable cutting forces when working with workpieces of various sizes is therefore not possible. Greatly variable cutting forces occur, for example, when milling chamfers and core flashings on castings, particularly when cleaning a rough casting.

It is possible also to provide preloadable dovetail or flat guides adjustable in most cases without play as, for example, by means of a wedge, to provide a damping effect in the guides which improves the possiblity of application of one of the initially mentioned feed arrangements. However, no constant or reproducible friction and damping conditions can be achieved in the guides for an extended period of time. Nevertheless, this is important for a stable position control system and chatter-free milling in the case of a feed drive with hydraulic cylinders. Also, the use of special wipers for keeping the guides clean impairs the relationship of machine components.

It is also known to provide feed arrangements, especially in numerical and controlled machine tools, wherein a stable control system and chatter-free milling can be achieved with improved performances and shifting paths by the use of ball-rotary spindles driven by electrical or hydraulic motors, but such feed arrangements are very expensive. Furthermore, these spindle drives are very sensitive to dust and sand and are thus poorly suited for application in foundries and casting cleaning rooms. Providing a completely closed cover around the spindle drive with, for example, bellows to permit relative movement of portions thereof, enlarges the overall length and thus decreases the rigidity of the machine.

BRIEF DESCRIPTION OF THE INVENTION

Accordingly, it is an object of the present invention to provide a feed arrangement for a machine of the abovedescribed type which decreases or eliminates the tendency to chatter in the case of greatly changing cutting forces while avoiding the disadvantages of the prior art, thus guaranteeing a stable position control system and suitability for application in very dusty environments such as foundries and cleaning establishments.

Briefly described, the invention includes a feed system for a machine tool of the type having a cutting tool for cutting a workpiece, a frame, carriage and drive means for providing relative linear and swiveling movement between the tool and the workpiece on the frame, means for measuring the relative movement between the tool and workpiece, and guide members on the frame for movably supporting the carriage, the improvement including adjustable bearing means on the carriage for slidably mounting the carriage on the guide members, the bearing means including dry-running friction bearings having an adjustable resistance to movement, and means for applying fluid under pressure to the bearings to adjust the resistance to movement whereby the resistance is adjustable to at least equal the force of the cutting tool against the workpiece.

BRIEF DESCRIPTION OF THE DRAWINGS

In order that the manner in which the foregoing and other objects are attained in accordance with the invention can be understood in detail, a particularly advantageous embodiment thereof will be described with reference to the accompanying drawings, which form a part of this specification, and wherein:

FIG. 4 is an enlarged partial plan view of the portion of the apparatus within circle A of FIG. 2;

FIG. 5 is an end elevation, in partial section, along line V—V of FIG. 4;

DETAILED DESCRIPTION OF THE INVENTION

Figure 1:
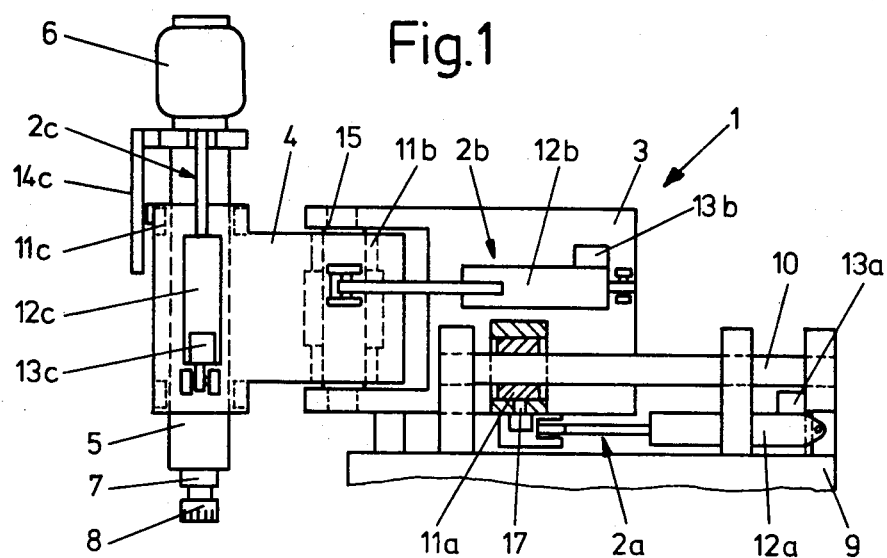
FIG. 1 is a simplified side elevation of a milling machine assembly illustrating a feed arrangement in accordance with the present invention.
Figure 2:
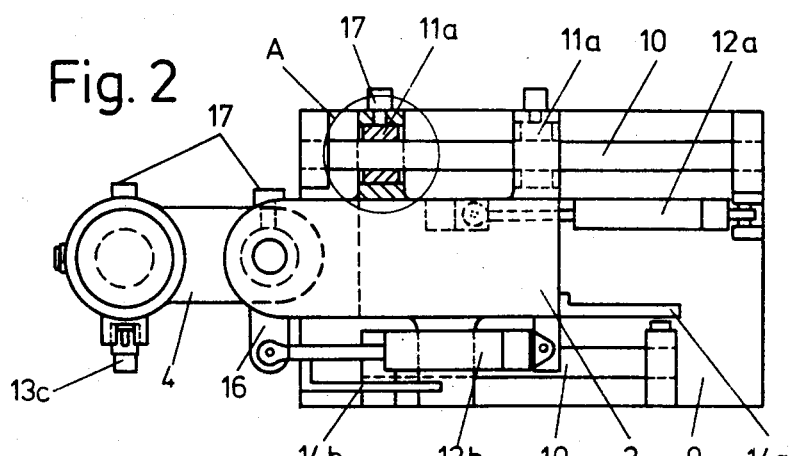
FIG. 2 is a top plan view of the apparatus of FIG. 1.

In FIGS. 1 and 2, there is shown in somewhat simplified form a milling machine assembly which involves three fed arrangements identified as 2a, 2b and 2c. The milling assembly illustrated includes a slidable carriage 3, a swiveable housing 4, and a spindle sleeve 5 which is axially shiftable in the housing 4 and which has a milling spindle 7 with a milling tool 8 rotatably driven by a motor 6.

The carriage 3 is mounted so as to be longitudinally shiftable by the first feed arrangement 2a on a stand 9, the carriage being slidably mounted on longitudinal guides which are formed as guide shafts 10, the mounting of carriage 3 on the shafts 10 including friction bearings 11a. The feed movement is produced by an hydraulic piston and cylinder drive 12a which is controlled by an electrohydraulic servo valve 13a disposed on the drive. On the carriage 3, the housing 4 is mounted swivelably in friction bearings 11b on a swiveling post or axle 15. A circular, arc-shaped feed arrangement around the swiveling post 15 is produced by the second feed arrangement 2b which has a hydraulic piston and cylinder drive assembly 12b which, at one end thereof, is pivotably attached to a swiveling arm 16 mounted on housing 4, and, at the other end, to carriage 3, the action of this assembly being controlled by means of a servo valve 13b disposed on the drive. As will be recognized, it would also be possible to obtain the swiveling movement using a rotary piston drive not shown) which operates in a circular or arc-shaped movement.

The spindle sleeve 5 is mounted in housing 4 in friction bearings 11c and is shiftable in a direction parallel to the swiveling post 15 by means of the third feed arrangement 2c, this feed arrangement similarly having an hydraulic piston and cylinder drive assembly 12c and a controlling servo valve 13c.

Each of the three feed arrangements is provided with an apparatus for measuring and indicating the extent of movement and position of the related moving components, these being identified as odometric systems 14a, 14b and 14c which are preferably linear motion pickups so that the feed movements are controlled under various circumstances by at least one of the control systems. The milling assembly is thus shiftable or swivelable in three different directions and it will be recognized that the path information can be supplied by means of a numerical control system. As previously noted, in place of the milling assembly it would also be possible to move a workpiece supporting table with the feed arrangements in cooperation with either a fixed or movable milling tool.

The bearing arrangements 11a, 11b and 11c can be preloaded by means of a pressure arrangement 17 in a radial direction with respect to the associated post guides. FIGS. 4 and 5 show such a friction bearing 11a in cross section and longitudinal section, somewhat enlarged.

As shown therein, a bearing bushing 20 mounted in carriage 3 encloses the post guide 10 such that three slide surfaces 21, mutually displaced by 120°, are in sliding contact with the post guide 10. Bearing bushing 20 is held in carriage 3 in the axial directions by an annular collar 22 and by an externally threaded collar 23 which threadedly engages a portion of collar 22. One of the three slide surfaces 21 is provided with a radial bore 24 which receives a peg 26 of a pressure element 25. Because the pressure element 25 is disposed in a bore 27 of the carriage 3 radially with respect to the post axis, peg 26 prevents twisting movement around that axis of the bearing bushing 20. Pressure element 25, with its annular surface 28, is pressed by means of the pressure arrangement 17 against the bearing bushing 20.

In the embodiment shown, the pressure arrangement 17 includes a pressure piston 29 acted upon by a pressure medium, preferably oil under pressure, and the piston rod 30 of the pressure piston presses on the pressure element 25. Pressure piston 29 is mounted in a cylinder housing 32 which is provided with an external thread 31, the housing being screwed into a mounting member 33. Mounting member 33 is fixedly attached by means of screws 34 and intermediate spacing elements 35 to carriage 3. At the upper surface of the mounting member 33, a conduit 36 for the pressure medium is connected by means of a threaded coupling 37.

Bearing bushing 20 is provided with a radial slit 38 on the peripheral side opposite bore 24 which receives the pressure element 25, the slit being continuous in the longitudinal or axial direction of the bearing bushing 20. Because of the slit 38, the shaping property of the bearing bushing 20 is improved so that the slide surfaces 21 can be preloaded with smaller compression forces against the post guide 10.

The axially extending edges 45, which define the angular extent of slide surfaces 21, are formed as sharp edges as a result of which the edges act, during operation, simultaneously as wipers against dust, millings, sand, etc., in the preloaded bearing bushing 20. Thus, additional wipers or gasket which can change the frictional relationships in an uncontrollable fashion can be omitted in the vicinity of the bearings.

The bearing bushing 20 preferably comprises bronze containing graphite and may thus be used as a dry-running friction bearing, in which case its adhesive or static friction coefficient value is, at most, about 25% higher than the sliding friction coefficient, the value of which is about 0.1. These dry-running friction bearings will reliably last for long operational times with constant friction values and, as a result of the adjustable preloading of the bearing bushings producible by the pressure piston 29, a reproducible, adjustable or regulatable shifting resistance of the feed arrangement 2 will be achieved.

For an operating process with a stable position control system and chatter-free milling, it is necessary that the shifting resistance or the swiveling resistance of any of the feed arrangements 2a–c is at least equal to, and at most ten times as large, as the maximum occurring (or the measured) cutting force by the milling tool 8, the shifting resistance being preferably in the order of 2–5 times as large.

Figure 3:
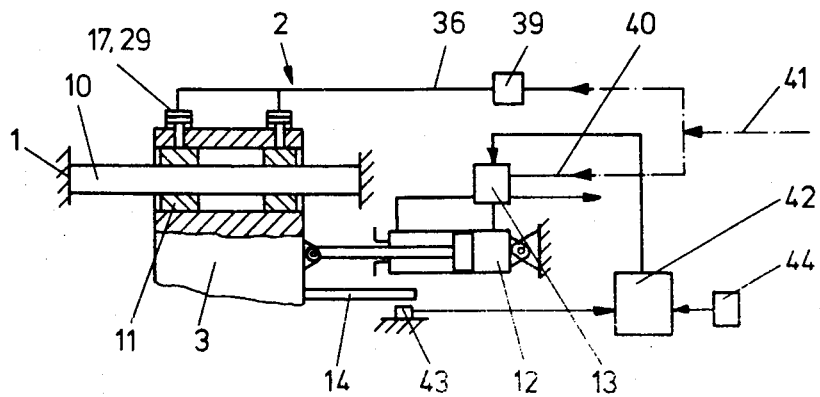
FIG. 3 is a schematic diagram showing the flow and control circuits for a feed arrangement usable in the apparatus of FIGS. 1 and 2.

As is apparent from the schematic illustration of a feed arrangement 2 in FIG. 3, in the conduit 36 for the feed line of the pressure medium to the pressure pistons 29, there is a pressure adjusting valve 39 disposed on the friction bearings 11 by means of which the shifting resistance can be adjusted. The optimum milling performance for a workpiece can be determined in correspondence to the greatest removal of chips to be expected and in correspondence with the adjusted feeding speed such that the shifting resistance may be adjusted corresponding to the above values by this pressure adjusting valve.

The servo valve 13 required for the control of piston drive 12 is connected by a conduit 40 with a thrust generator, not shown in detail (preferably a regulating pump), and the feed line 36 is feed by a separate thrust generator, corresponding to the dash-dot lines for the feed line 41, both lines 36 and 40 are fed by one common thrust generator.

The electrically controllable servo valve 13 is effectively connected with a control 42 and a measuring head 43 of the odometric system 14 is similarly connected with the control 42 for the purpose of comparing the theoretical or desired value with the actual value. The data input into the control 42 for the adjusting paths of carriage 3, of housing 4, or of the spindle sleeve 5, can be accomplished, for example, by a punch tape reader 44.

The piston surface of the piston drive 12 is selected to be sufficiently large so that, in the case of the maximum adjustable pressure, the feed force on the carriage amounts to at least double, and preferably quadruple, the maximum cutting force occurring in circumstances of the greatest milling cutter performance whenever, as has been described, the shifting resistance amounts to, for example, double the cutting force.

This results in a sufficiently rigid and, at the same time, still sensitive feed drive, which makes possible the use of a position control system in the case of rapidly changing cutter forces.

When an electrical pressure adjusting valve 39 is used in place of a manually adjustable valve, then it is possible to regulate the shifting resistance automatically, depending upon the performance of the milling cutting or of the cutting force, such that valve 39 is adjusted as a function of the measured milling cutting performance or cutting force. This regulation avoids the unnecessary conversion of energy into friction losses and, thus, into heat. At the same time, any unnecessary wear of the friction bearings is also avoided. A measure of the milling cutter performance can be accomplished, for example, by the measurement of the motor performance or of the torque on the milling cutter.

Figure 6:
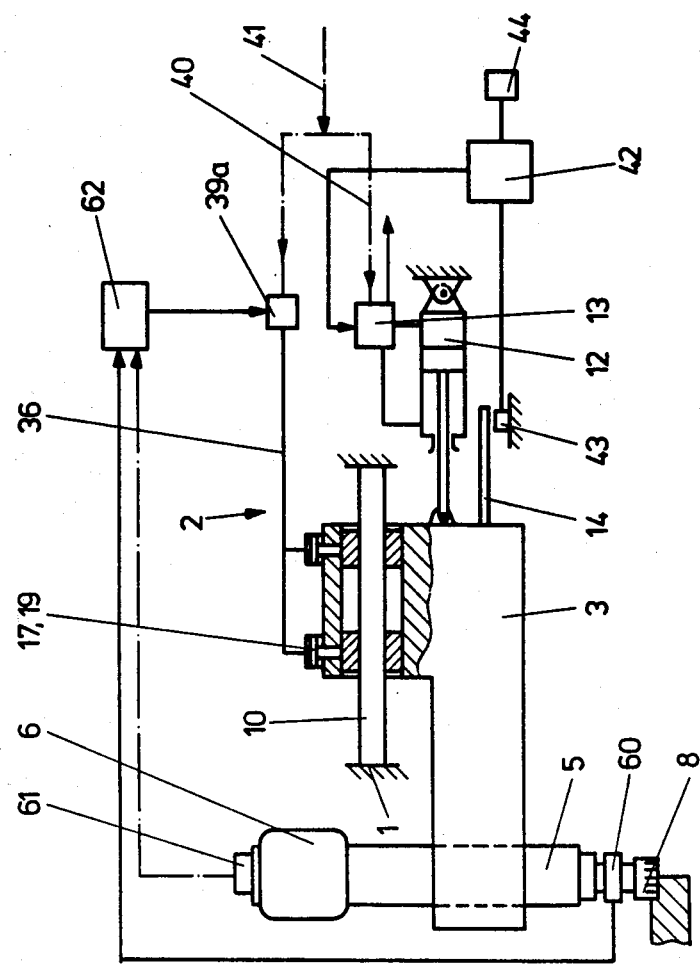
FIG. 6 is a schematic diagram similar to FIG. 3, but showing an automatic control system in accordance with the present invention.

FIG. 6 shows a further embodiment of a position control system in accordance with the invention in which an automatic control system is employed for positioning the movable elements of the system. It will be observed that certain elements of the system shown in FIG. 6 were previously shown and described in FIGS. 1 and 3. These elements are identified by the same reference numerals as before and will not be described again in detail.

As mentioned in connection with FIG. 3, a pressure adjusting valve 39 is provided to control the flow of fluid pressure medium in conduit 2 to pressure units 17 and 29, valve 39 being adjustable by the machine operator. In the embodiment of FIG. 6, this control function is performed by a valve 39a which responds to a signal provided by a valve control unit 62. Unit 62 receives input signals from transducers 60 and 61 mounted, respectively, on spindle 7 and drive motor 6. Transducers 60 is a force responsive transducer, such as one or more strain gauges, capable of producing a signal representative of later and/or torsional stress in the spindle. Thus, the signals produced thereby are representative of resistive forces in the cutting of the workpiece and of chatter resulting from the cutting.

Transducer 61 is a transducer capable of producing a signal representative of motor current and is therefore representative of the driving force exerted by motor 6.

The signals produced by transducers 60 and 61 are combined in control unit 62 to produce a control signal representative of those force characteristics which require pressure to be applied to the bearings, which control signal is supplied to valve 39a to control flow of fluid under pressure to the bearings pressure units.

For a simplified embodiment of the feed arrangement, one may also use in place of the hydraulic pressure generation in the friction bearings, a mechanical pressure arrangement 17 including, for example, cup springs or Belleville springs adjustable with screws or a cam.

Figure 7:
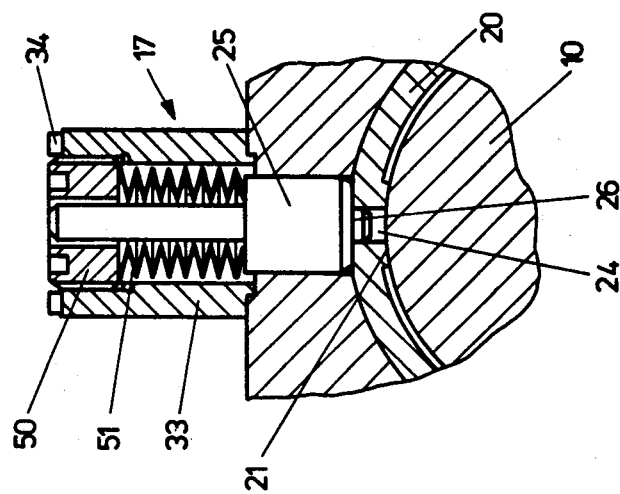
FIG. 7 is a view similar to FIG. 5 showing spring means for bearing control.

FIG. 7 shows an embodiment of a bearing pressure unit employing such springs. As shown therein, mounting sleeve 33 is provided with internal threads at the upper end thereof which receives an externally threaded pressure control nut 50. The lower end of nut 50 presses against the upper end of a stack of cup or Belleville springs 51, the lower end of which presses against the upper surface of pressure element 25. Recesses are provided at the upper surface of nut 50 for engagement by a manual tool or, if desired, by a drive wheel coupled to the output shaft of a drive motor, as by a gear train, for automatic adjustment.

The feed arrangement according to the invention wherein the feed movement is produced by hydraulic piston and cylinder drive and is controlled by a position control system, can also be used in the case of rapidly changing and great cutting forces without having to be concerned about a failure of the milling cutter by chattering, or about an unstable or imprecise control system. As a result of the adjustability of the shifting resistance, one can omit large unchangeable masses which must be moved and, as a result of which, the profitability of such a drive is increased. This is made possible by the dry-running preloadable friction bearings which have constant frictional conditions for the damping effect. The use in factory situations having environments involving a great deal of dust, especially with blown sand, can be accomplished safely despite the omission of special gaskets at the guides. The stripping effect of the edges of pressed-on slide surfaces of the friction bearings prevents the penetration of the dust after a short running in time between slide surfaces and the guides.

While one advantageous embodiment has been chosen to illustrate the invention, it will be understood by those skilled in the art that various changes and modifications can be made therein without departing from the scope of the invention as defined in the appended claims.

What is claimed is:

1. A feed system for a machine tool of the type having a cutting tool for cutting a workpiece, a frame, a carriage and hydraulic piston-cylinder drive means for providing relative linear and swiveling movement between the tool and the workpiece on the frame, means for measuring the relative movement between the tool and workpiece, means for determining the force of the cutting tool against the workpiece and guide members on the frame for movably supporting the carriage, the improvement comprising
adjustable bearing means on said carriage for slidably mounting said carriage on said guide members, said bearing means including
dry-running friction bearings having an adjustable resistance to movement, and
means for applying pressure to said bearings to adjust said resistance to movement to substantially one to ten times the force of the cutting tool against the workpiece.

2. A system according to claim 1, wherein said means for applying pressure includes
a fluid pressure piston operatively associated with each of said bearings; and
a source of fluid under pressure coupled to said piston, the pressure of said source being adjustable.

3. A system according to claim 1, wherein said means for applying pressure includes springs.

4. A system according to claim 1 wherein said guide members include elongated generally cylindrical guides and said bearings including bearing bushings having three slide surfaces angularly displaced by about 120°, and wherein said means for applying pressure acts radially on said slide surfaces.

5. A system according to claim 4 wherein each of said slide surfaces terminates in sharp, abrupt axially extending edges which serve as wipers.

6. A system according to claim 4 wherein each of said bearing bushings includes means defining a continuous slit through a wall thereof.

7. A system according to claim 4 wherein each of said means for applying pressure includes a pressure element having a peg, and wherein each of said bushings includes a radial bore engaged by said peg.

8. A system according to claim 1, wherein each of said bearings includes a bearing bushing of bronze containing graphite having a static coefficient of friction no greater than 25% more than its coefficient of sliding friction.

9. A system according to claim 1, wherein said means for applying pressure adjusts said resistance to about 5 times the force of the cutting tool against the workpiece.

10. A system according to claim 1, wherein said means for applying pressure comprises means for automatically controlling the amount of pressure applied to said bearings as a function of the force of the cutting tool against the workpiece.

* * * * *